(12) United States Patent
Terada

(10) Patent No.: US 11,264,828 B2
(45) Date of Patent: Mar. 1, 2022

(54) VEHICLE-MOUNTED POWER SOURCE CONTROL APPARATUS, VEHICLE-MOUNTED POWER SOURCE APPARATUS, AND VEHICLE CONTROL METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Noriko Terada, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/252,800

(22) PCT Filed: Jun. 4, 2019

(86) PCT No.: PCT/JP2019/022103
§ 371 (c)(1),
(2) Date: Dec. 16, 2020

(87) PCT Pub. No.: WO2019/244616
PCT Pub. Date: Dec. 26, 2019

(65) Prior Publication Data
US 2021/0249895 A1    Aug. 12, 2021

(30) Foreign Application Priority Data

Jun. 21, 2018    (JP) ............................. JP2018-117744

(51) Int. Cl.
*B60R 16/033*    (2006.01)
*H02J 9/06*    (2006.01)
(Continued)

(52) U.S. Cl.
CPC .............. *H02J 9/06* (2013.01); *B60R 16/033* (2013.01); *H02J 7/0068* (2013.01); *H02J 7/14* (2013.01)

(58) Field of Classification Search
CPC .... H02J 9/06; H02J 7/0068; H02J 7/14; H02J 7/34; H02J 7/00; B60R 16/033
See application file for complete search history.

(56) References Cited

U.S. PATENT DOCUMENTS 9,802,562 B2   10/2017   Yasunori et al.
2016/0059807 A1   3/2016   Iwasaki et al.
(Continued)

FOREIGN PATENT DOCUMENTS

JP   2007-19728 A   1/2007
JP   2010-178528 A   8/2010
(Continued)

OTHER PUBLICATIONS

International Search Report, Application No. PCT/JP2019/022103, dated Aug. 27, 2019. ISA/Japan Patent Office.

*Primary Examiner* — Daniel Cavallari
(74) *Attorney, Agent, or Firm* — Honigman LLP

(57) ABSTRACT

Provided are a vehicle-mounted power source control apparatus, a vehicle-mounted power source apparatus, and a vehicle control method that are highly versatile. A power source control apparatus sets a setting value corresponding to a combination of loads to be connected to multiple output ports based on information determining a candidate value for a setting value for each combination of the loads. Also, control relating to backup is performed based on the set (Continued)

setting value. By doing so, it is possible to perform control relating to backup in a mode corresponding to the combination of the loads.

8 Claims, 2 Drawing Sheets

(51) Int. Cl.
*H02J 7/00* (2006.01)
*H02J 7/14* (2006.01)

(56) References Cited

U.S. PATENT DOCUMENTS

| | | |
|---|---|---|
| 2017/0080883 A1 | 3/2017 | Yasunori et al. |
| 2019/0115175 A1* | 4/2019 | Saito .................... H01H 47/002 |
| 2019/0173311 A1* | 6/2019 | Kudo .................... H02J 7/1446 |
| 2020/0335991 A1* | 10/2020 | Tsukamoto ........... H02J 7/0048 |

FOREIGN PATENT DOCUMENTS

| | | |
|---|---|---|
| JP | 2014-184752 A | 10/2014 |
| JP | 2015-56926 A | 3/2015 |

* cited by examiner

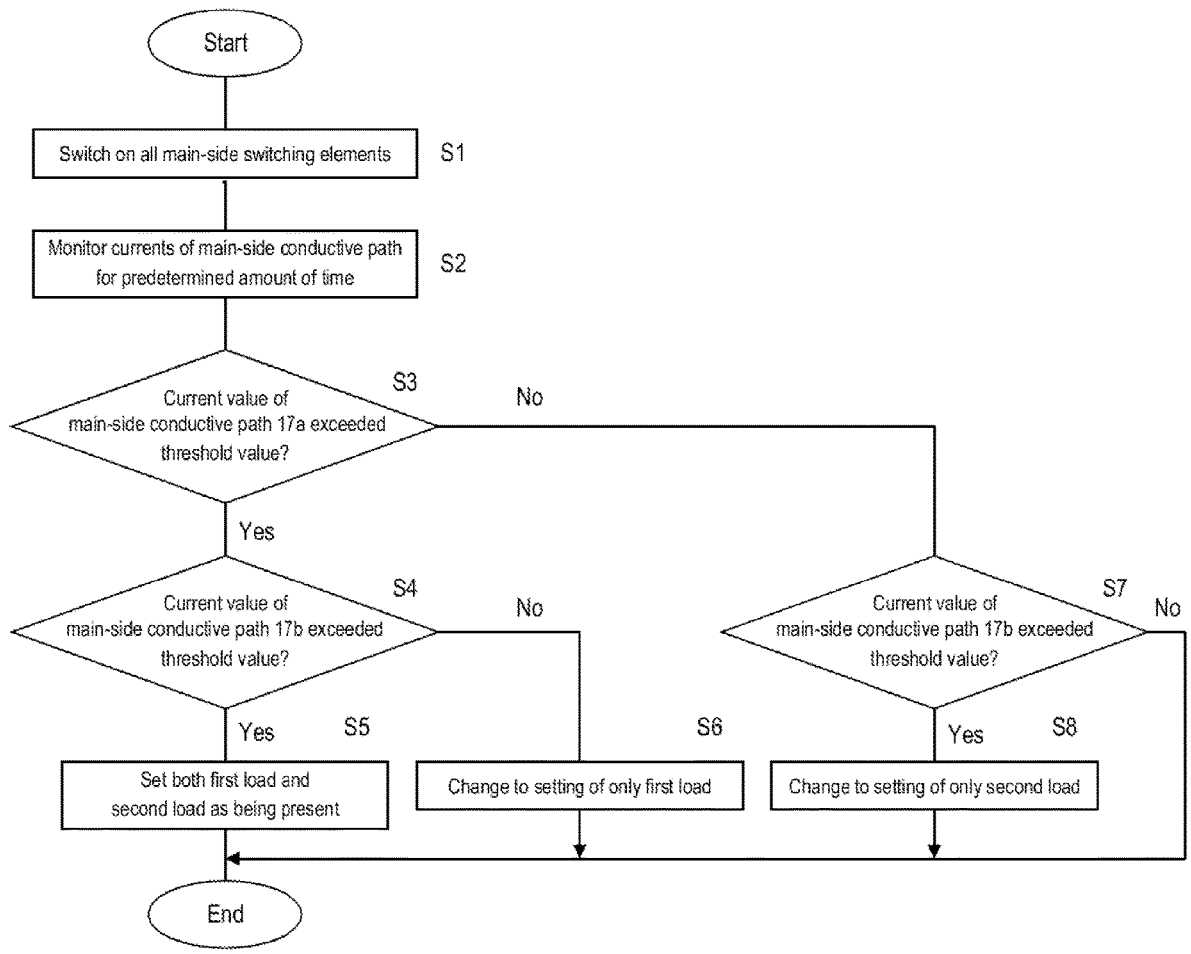

VEHICLE-MOUNTED POWER SOURCE CONTROL APPARATUS, VEHICLE-MOUNTED POWER SOURCE APPARATUS, AND VEHICLE CONTROL METHOD

CROSS-REFERENCE TO RELATED APPLICATIONS

This application is the U.S. national stage of PCT/JP2019/022103 filed on Jun. 4, 2019, which claims priority of Japanese Patent Application No. JP 2018-117744 filed on Jun. 21, 2018, the contents of which are incorporated herein.

TECHNICAL FIELD

The present disclosure relates to a vehicle-mounted power source control apparatus, a vehicle-mounted power source apparatus, and a vehicle control method.

BACKGROUND

JP 2015-217734A discloses a technique in which, in a vehicle-mounted system, power is supplied from a main battery to a load, and if the power supply from the main battery is interrupted, backup is performed using a sub-battery. If this kind of technology is mounted in a vehicle, control corresponding to a combination of loads to be backed up is required. Also, the combination of loads to be backed up differs according to the vehicle type in some cases. In view of this, conventionally, various types of vehicles have been dealt with by developing software for each combination of loads to be backed up, manufacturing semiconductor chips in which the software is incorporated, and mounting a corresponding semiconductor chip in a vehicle.

However, there has been a problem in that when a semiconductor chip is manufactured for each combination of loads as described above, this leads to an increase in the manufacturing cost and the management cost.

The present disclosure was made based on the above-described circumstance, and aims to realize a vehicle-mounted power source control apparatus, a vehicle-mounted power source apparatus, and a vehicle control method that are highly versatile.

SUMMARY

A vehicle-mounted power source control apparatus, which is a first aspect of the present disclosure, is a vehicle-mounted power source control apparatus for performing control relating to backup using a second power source unit in a vehicle-mounted power source system including a plurality of output ports for which types of loads to be connected are determined in advance, a first power source unit for supplying electrical power to the loads connected to the output ports, and the second power source unit, which functions as a backup power source if power supply from the first power source unit is interrupted. The power source control apparatus includes a setting unit configured to, based on information determining a candidate value for a setting value for each combination of the loads, set the setting value corresponding to the combination of the loads connected to the plurality of output ports; and a control unit configured to perform the control relating to backup based on the setting value set by the setting unit. The second power source unit includes a plurality of power storage elements. The setting unit sets the number of the power storage elements as the setting value, and the control unit performs the control relating to backup based on the setting value.

A vehicle-mounted power source apparatus, which is a second aspect of the present invention, includes: a second power source unit; and the vehicle-mounted power source control apparatus, which is the first aspect.

A vehicle control method, which is a third aspect of the present disclosure, is a control method for controlling a vehicle including a plurality of output ports for which types of loads to be connected are determined in advance, a first power source unit for supplying electrical power to the loads connected to the output ports, and a second power source unit that functions as a backup power source if power supply from the first power source unit is interrupted. The vehicle control method includes a step of setting, based on information determining a candidate value for a setting value for each combination of the loads, the setting value corresponding to the combination of the loads connected to the plurality of output ports; and a step of performing control relating to backup based on the setting value set by the setting unit.

Advantageous Effects of the Disclosure

According to the vehicle-mounted power source control apparatus of the first aspect, the setting value corresponding to the combination of the loads connected to the plurality of output ports can be set based on the information determining the candidate value for the setting value for each combination of the loads. Also, the control relating to backup can be performed based on the setting value. Accordingly, when attached to a vehicle, the power source control apparatus can set the setting value corresponding to the combination of the connected loads and can perform the control relating to backup control based on the setting value. That is, according to the vehicle-mounted power source control apparatus, it is possible to suitably perform the control relating to backup on multiple types of vehicles with mutually different combinations (numbers and types) of mounted loads, and therefore versatility can be improved.

According to the vehicle-mounted power source apparatus of the second aspect, it is possible to exhibit an effect similar to that of the vehicle-mounted power source control apparatus of the first aspect.

According to the vehicle control method of the third aspect, the setting value corresponding to the combination of the loads connected to the plurality of output ports can be set based on information obtained by determining the candidate value for the setting value for each combination of the loads. Also, the control relating to backup can be performed based on the setting value. That is, according to the vehicle control method, it is possible to suitably perform the control relating to backup on multiple types of vehicles with mutually different combinations (numbers and types) of mounted loads, and therefore versatility can be improved.

BRIEF DESCRIPTION OF DRAWINGS

FIG. 2 is a flowchart illustrating a flow of setting processing executed by a vehicle-mounted power source control apparatus.

FIG. 3 is an illustrative diagram illustrating candidate values for a setting value corresponding to a combination of loads.

DETAILED DESCRIPTION OF PREFERRED EMBODIMENTS

Figure 1:
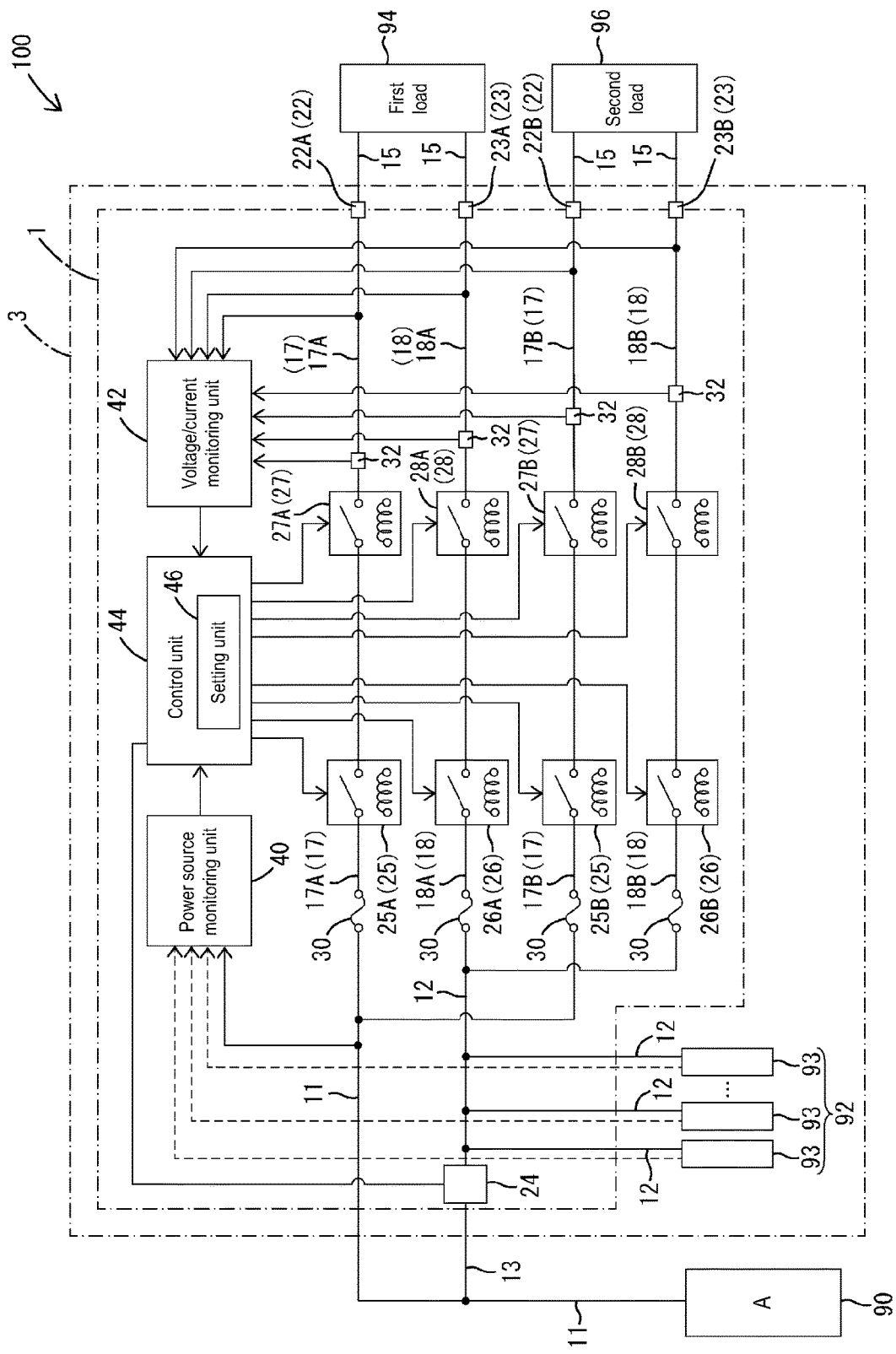
FIG. 1 is a circuit diagram illustrating a configuration of a vehicle-mounted power source system of a first embodiment.

In the vehicle-mounted power source control apparatus of the first aspect, it is assumed that the second power source unit is composed of multiple power storage elements, the setting unit sets the number of the power storage elements as the setting value, and the control unit may perform the control relating to backup based on this setting value.

According to this configuration, the number of the power storage elements is set as the setting value corresponding to the combination of the loads connected to the output ports. For this reason, suitable control can be performed on multiple types of vehicles with different numbers of power storage elements according to the combination of the mounted loads.

In the vehicle-mounted power source control apparatus of the first aspect, the setting unit may also set the target value of the charge voltage as the setting value, and the control unit may also perform charging control such that the charge voltage of the second power source unit reaches the above-described setting value.

According to this configuration, the target value of the charge voltage is set as the setting value corresponding to the combination of the loads connected to the output ports. For this reason, the charging control can be performed on multiple types of vehicles with different power storage capacities of the second power source unit according to the combination of the mounted loads such that the charge voltage of the second power source unit reaches a proper target value.

The vehicle-mounted power source control apparatus of the first aspect may also include a voltage monitoring unit for monitoring voltages of conductive paths that are provided separately for each output port and that supply electrical power to the loads connected to the output port. As for the setting value, the target voltage value of the voltage monitored by the voltage monitoring unit may also be set as the setting value. Furthermore, the control unit may also perform control such that the voltages of the conductive paths reach the above-described setting value by turning on and off the switching elements provided on the respective conductive paths.

According to this configuration, the target voltage value corresponding to the combination of the loads connected to the output ports is set. For this reason, control can be performed on multiple types of vehicles with different target voltage values according to the combination of the mounted loads such that the voltage values supplied to the loads reach suitable voltage values.

The vehicle-mounted power source control apparatus of the first aspect may also include a current monitoring unit for monitoring currents of conductive paths that are provided separately in correspondence with the respective output ports and that supply electrical power to the loads connected to the output ports. The setting unit may also set the maximum current value of the current monitored by the current monitoring unit as the setting value. Furthermore, if it is determined that the current value of a conductive path has reached the above-described setting value, the control unit may also perform a predetermined protection operation.

According to this configuration, the maximum current value corresponding to the combination of loads connected to the output port is set. For this reason, the protection operation can be performed at an appropriate time on multiple types of vehicles with different maximum current values according to the combination of the mounted loads.

First Embodiment

Hereinafter, a first embodiment of the present disclosure will be described.

A vehicle-mounted power source system 100 shown in FIG. 1 (hereinafter referred to also as "power source system 100") includes multiple output ports 22 and 23 to which loads 94 and 96 of multiple types can be connected, a first power source unit 90 that supplies electrical power to the loads 94 and 96 connected to the output ports 22 and 23, and a second power source unit 92 that functions as a backup power source when power supply from the first power source unit 90 is interrupted.

For example, the first power source unit 90 functions as a main battery, and is constituted as, for example, a known vehicle-mounted battery such as a lithium ion battery. A terminal on the high-potential side of the first power source unit 90 is electrically connected to a first input-side conductive path 11 and the first power source unit 90 applies a predetermined output voltage to the first input-side conductive path 11. Also, the terminal on the low-potential side of the first power source unit 90 is electrically connected to a grounding portion (not shown).

The second power source unit 92 functions as, for example, a sub-battery, and is constituted by, for example, multiple power storage elements 93 (e.g., capacitors). Terminals on the high-potential side of the second power source unit 92 are electrically connected to a second input-side conductive path 12 and the second power source unit 92 applies a predetermined output voltage to the second input-side conductive path 12. Also, the terminals on the low-potential side of the second power source unit 92 are electrically connected to a grounding portion (not shown).

The first input-side conductive path 11 and the second input-side conductive path 12 are electrically connected via an intermediate conductive path 13, and a voltage converter 24 is provided on the intermediate conductive path 13. The voltage converter 24 is constituted as, for example, a step-down DC/DC converter, can receive input of a voltage obtained based on the output voltage of the first power source unit 90, and can step down the input voltage and output the resulting voltage to the second power source unit 92 side. The second power source unit 92 is charged by inputting the voltage output from the voltage converter 24.

The output ports 22 and 23 are provided in correspondence with each of the loads 94 and 96, and the types of loads to be connected thereto are determined in advance. Specifically, the output ports 22A and 23A are provided in correspondence with the first load 94, and the output ports 22B and 23B are provided in correspondence with the second load 96. The multiple output ports 22 may also be visually distinguishable from each other. The multiple output ports 23 may also be visually distinguishable from each other. For example, the multiple output ports 22 and 23 may be made visually distinguishable from each other by adding identification numerals corresponding to the types of the loads 94 and 96 thereto. The multiple output ports 22 and 23 may also have a structure in which only the corresponding loads 94 and 96 can be connected (a structure in which non-corresponding loads 94 and 96 are not connected).

The first load 94 and the second load 96 are each constituted by including an actuator and an ECU for controlling the actuator. The first load 94 and the second load 96 can be connected to the corresponding output ports 22 and 23 via output-side conductive paths 15. The first load 94 and the second load 96 are each mounted or not mounted in some cases, depending on the type of the vehicle (vehicle type).

That is, the vehicle type is categorized into a vehicle type (vehicle type A) in which both the first load 94 and the second load 96 are mounted, a vehicle type (vehicle type B) in which only the first load 94 is mounted, a vehicle type (vehicle type C) in which only the second load 96 is mounted, and a vehicle type (vehicle type D) in which neither of the loads 94 and 96 is mounted.

The multiple output ports 22 are electrically connected to the first input-side conductive path 11 via main-side conductive paths 17 provided separately in correspondence therewith. Specifically, the output port 22A is electrically connected to the first input-side conductive path 11 via a main-side conductive path 17A, and the output port 22B is electrically connected to the first input-side conductive path 11 via a main-side conductive path 17B.

The multiple output ports 23 are electrically connected to the second input-side conductive path 12 via sub-side conductive paths 18 provided separately in correspondence therewith. Specifically, the output port 23A is electrically connected to the second input-side conductive path 12 via the sub-side conductive path 18A, and the output port 23B is electrically connected to the second input-side conductive path 12 via the sub-side conductive path 18B.

The multiple main-side conductive paths 17 each have one end electrically connected to the first input-side conductive path 11, and the other ends are electrically connected to different output ports 22. The multiple sub-side conductive paths 18 each have one end electrically connected to the second input-side conductive path 12, and the other ends are electrically connected to different output ports 23.

The electrical power of the first power source unit 90 is supplied to the loads 94 and 96 through the first input-side conductive path 11, the main-side conductive paths 17, the output ports 22, and the output-side conductive paths 15. Also, the electrical power of the second power source unit 92 is supplied to the loads 94 and 96 through the second input-side conductive path 12, the sub-side conductive paths 18, the output ports 23, and the output-side conductive paths 15. Note that hereinafter, in the main-side conductive paths 17, the first power source unit 90 side will be called the input side, and the output port 22 side will be called the output side. Also, in the sub-side conductive paths 18, the second power source unit 92 side will be called the input side, and the output port 23 side will be called the output side.

The power source system 100 includes a power source control apparatus 1. The power source control apparatus 1 performs control such that backup using the second power source unit 92 is performed if power supply from the first power source unit 90 to the loads 94 and 96 is interrupted. The power source control apparatus 1 includes the above-described multiple output ports 22 and 23, the multiple main-side conductive paths 17, and the multiple sub-side conductive paths 18. Furthermore, the power source control apparatus 1 includes main-side switching elements 25 and 27, sub-side switching elements 26 and 28, a power source monitoring unit 40, a voltage/current monitoring unit 42, a control unit 44, and the like. Note that the power source control apparatus 1 constitutes a power source apparatus 3 together with the second power source unit 92.

Fuses 30, the main-side switching elements 25 and 27 (main-side switching elements 25A and 27A and sub-side switching elements 25B and 27B), current detectors 32, and the like are provided on the multiple main-side conductive paths 17 (main-side conductive path 17A and main-side conductive path 17B).

The main-side switching elements 25 are provided on the output sides of the fuses 30. The main-side switching elements 25 are constituted as, for example, relay switches, and allow power supply from the first power source unit 90 to the loads 94 and 96 connected to the output ports 22 by entering an on state.

The main-side switching elements 27 are provided on the output sides of the main-side switching elements 25. The main-side switching elements 27 are constituted as, for example, relay switches, and change the output voltage to the output side by performing an on/off switching operation.

Fuses 30, sub-side switching elements 26 and 28 (sub-side switching elements 26A and 28A and sub-side switching elements 26B and 28B), current detectors 32, and the like are provided on the multiple sub-side conductive paths 18 (sub-side conductive path 18A and sub-side conductive path 18B).

The sub-side switching elements 26 are provided on the output sides of the fuses 30. The sub-side switching elements 26 are constituted as, for example, relay switches, and allow power supply from the second power source unit 92 to the loads 94 and 96 connected to the output ports 23 by entering an on state.

The sub-side switching elements 28 are provided on the output sides of the sub-side switching elements 26. The sub-side switching elements 28 are constituted as, for example, relay switches, and change the output voltage to the output side by performing an on/off switching operation.

The power source monitoring unit 40 monitors the output voltage of the first power source unit 90 and monitors the charge voltage of the second power source unit 92 (power storage elements 93). The output voltage of the first power source unit 90 and the charge voltage of the second power source unit 92 (power storage elements 93) are detected by a voltage detector (not shown). The power source monitoring unit 40 is formed by including an AD converter or the like, and upon acquiring an analog signal indicating the output voltage of the first power source unit 90 or the charge voltage of the second power source unit 92 (power storage elements 93) from the voltage detector, the power source monitoring unit 40 performs AD conversion and outputs the resulting signal to the control unit 44.

The voltage/current monitoring unit 42 monitors the voltages and the currents of the multiple main-side conductive paths 17 and monitors the voltages and the currents of the multiple sub-side conductive paths 18. The voltages of the multiple main-side conductive paths 17 and the voltages of the multiple sub-side conductive paths 18 are detected by voltage detectors (not shown). The currents of the main-side conductive paths 17 and the currents of the sub-side conductive paths 18 are detected by the current detectors 32. The voltage/current monitoring unit 42 is formed by including an AD converter and the like, and upon acquiring an analog signal indicating a detected value of a voltage detector (not shown) or a current detector 32, the voltage/current monitoring unit 42 performs AD conversion and outputs the resulting signal to the control unit 44. Note that the voltage/current monitoring unit 42 corresponds to an example of a voltage monitoring unit and corresponds to an example of a current monitoring unit.

The control unit 44 is constituted by including, for example, a micro-controller and the like, and includes a computation apparatus such as a CPU, a storage unit such as a ROM or a RAM, a driving unit such as a driver, and the like. The control unit 44 includes a setting unit 46 that sets a setting value corresponding to the combination of the loads 94 and 96 connected to the multiple output ports 22 based on information determining a candidate value for the setting value for each combination of the loads 94 and 96. The setting unit 46 determines the combination of the loads 94 and 96 connected to the multiple output ports 22 and stores the setting value corresponding to that combination. Also, when a predetermined execution condition is established, the control unit 44 reads out the setting value stored by the setting unit 46 and performs control relating to backup based on the setting value.

The control unit 44 can specify the output value of the first power source unit 90 and the charge voltage of the second power source unit 92 (power storage elements 93) based on the signal input from the power source monitoring unit 40. Also, based on the signal input from the voltage/current monitoring unit 42, the control unit 44 can specify the voltage values and the current values of the main-side conductive paths 17 and can specify the voltage values and the current values of the sub-side conductive paths 18.

The control unit 44 can drive the voltage converter 24 using the driving unit. By driving the voltage converter 24, the control unit 44 can perform charging control in which the voltage input from the first power source unit 90 side to the voltage converter 24 is stepped down, the stepped-down voltage is output to the second power source unit 92 side, and the second power source unit 92 is charged. Note that charging control corresponds to an example of "control relating to backup".

If a predetermined charging start condition is established, the control unit 44 drives the voltage converter 24 to start the charging of the second power source unit 92. The charging start condition is that, for example, an ignition switch has been switched from an off state to an on state. In a state in which the ignition switch is off, the voltage of the second power source unit 92 is held at a predetermined standby voltage, and when switched to the on state, charging is started. After starting charging, if a predetermined charging end condition is established, the control unit 44 stops the driving of the voltage converter 24 and ends the charging of the second power source unit 92. The charging end condition is that, for example, the charge voltage of the second power source unit 92 has reached a target value (hereinafter referred to also as a charge target value). The charge target value is different depending on the vehicle type (the combination of the mounted loads 94 and 96), and therefore the charge target value corresponding to the vehicle type is set through later-described setting processing.

If the power supply from the first power source unit 90 is interrupted, the control unit 44 performs backup using the second power source unit 92. The control unit 44 performs backup such that the output voltages (voltages of the sub-side conductive paths 18) to the loads 94 and 96 reach a predetermined target voltage value. Since the target voltage value differs depending on the vehicle type (the combination of the mounted loads 94 and 96), the target voltage value corresponding to the vehicle type is set through later-described setting processing.

Also, during backup, the control unit 44 performs a predetermined protective operation if the current values of the currents flowing in the loads 94 and 96 (the current values of the sub-side conductive paths 18) exceed a predetermined maximum current value. The predetermined protective operation is that, for example, the sub-side switching elements 28 are set to an off state. Accordingly, the currents flowing in the loads 94 and 96 are cut off, and large currents are prevented from flowing in the loads 94 and 96. The maximum current value differs depending on the vehicle type (combination of the mounted loads 94 and 96), and therefore the maximum current value corresponding to the vehicle type is set through later-described setting processing.

Next, a flow of setting processing executed by the control unit 44 will be described.

If the predetermined setting start condition is established, the control unit 44 executes the setting processing shown in FIG. 2. The setting start condition is that, for example, the power source control apparatus 1 (power source apparatus 3) is attached to the vehicle and started up. That is, the setting start condition is that the power source control apparatus 1 has been started up in a state in which the loads 94 and 96 corresponding to the vehicle type are connected. If the setting start condition is established, the control unit 44 switches all of the main-side switching elements 25 and 27 to the on state in step S1. Thereafter, in step S2, the currents of the main-side conductive paths 17 are monitored for a predetermined amount of time. Then, in step S3, it is determined whether or not the current value of the main-side conductive path 17A has exceeded a predetermined threshold value within the above-described predetermined amount of time.

If it is determined as a result of the determination in step S3 that the current value of the main-side conductive path 17A has exceeded the predetermined threshold value, it is determined that current is flowing in the main-side conductive path 17A (the first load 94 is connected to the output port 22A). Then, in step S4, it is determined whether or not the current value of the main-side conductive path 17B has exceeded a predetermined threshold value within the above-described predetermined amount of time.

If it is determined as a result of the determination in step S4 that the current value of the main-side conductive path 17B has exceeded a predetermined threshold value, it is determined that the current is flowing in the main-side conductive path 17B (the second load 96 is connected to the output port 22B). That is, it is determined that both of the loads 94 and 96 are connected (vehicle type A). Then, in step S5, the setting value corresponding to the vehicle type A is set by setting "both first load 94 and second load 96 are present".

If it is determined as a result of the determination in step S4 that the current value of the main-side conductive path 17B has not exceeded the predetermined value, it is determined that current is not flowing in the main-side conductive path 17B (the second load 96 is not connected to the output port 22B). That is, it is determined that only the first load 94 is connected (vehicle type B). Then, in step S6, the setting value corresponding to the vehicle type B is set by setting "only first load 94".

On the other hand, if it is determined as a result of the determination in step S3 that the current value of the main-side conductive path 17A has not exceeded the predetermined threshold value, it is determined that the current is not flowing in the main-side conductive path 17A (the first load 94 is not connected to the output port 22A). Then, in step S7, it is determined whether or not the current value of the main-side conductive path 17B has exceeded a predetermined threshold value within the above-described predetermined time.

If it is determined as a result of the determination in step S7 that the current value of the main-side conductive path 17B has exceeded a predetermined threshold value, it is determined that current is flowing in the main-side conductive path 17B (the second load 96 is connected to the output port 22B). That is, it is determined that only the second load 96 is connected (vehicle type C). Then, in step S8, the setting value corresponding to the vehicle type C is set by setting "only second load 96".

If it is determined as a result of the determination in step S7 that the current value of the main-side conductive path 17B has not exceeded the predetermined value, it is determined that current is not flowing in the main-side conductive path 17B (the second load 96 is not connected to the output port 22B). That is, it is determined that neither of the loads 94 and 96 is connected (vehicle type D). Then, the setting processing is ended without changing the setting value.

A program executed by the control unit 44 is stored in the above-described storage unit, and information determining a candidate value for the setting value for each combination of the loads 94 and 96 (vehicle type) is included in the program. The control unit 44 sets a setting value corresponding to the combination of the loads 94 and 96 connected to the multiple output ports 22 and 23 based on this information. The setting target item of the setting value is, for example, the number of power storage elements 93, the above-described target voltage value, the above-described maximum current value, and the like.

For example, "3" is set as the initial value of the number of the power storage elements 93. Regarding the number of power storage elements 93, in the above-described setting processing, if it is determined that both of the loads 94 and 96 are connected, the setting is changed to "8", if it is determined that only the first load 94 is connected, the setting is changed to "5", if it is determined that only the second load 96 is connected, the setting is changed to "4", and if it is determined that neither of the loads 94 and 96 is connected, the initial value remains as-is.

Due to the number of power storage elements 93 being set, the control unit 44 can recognize the number of power storage elements 93 corresponding to the combination of the loads 94 and 96 and control relating to the number of power storage elements 93 can be performed in a mode suitable for the vehicle type. For example, the control unit 44 specifies the charge target value of the second power source unit 92 based on the set number of power storage elements 93. For example, the control unit 44 stores "the charge target value per power storage element 93" in the storage unit in advance. Then, if the number of power storage elements 93 is set, a number obtained by multiplying "the charge target value per power storage element 93" by the set number of power storage elements 93 is specified as "the charge target value of the second power source unit 92".

During the charging of the second power source unit 92, the control unit 44 determines whether or not the charge voltage of the second power source unit 92 has reached the "charge target value of the second power source unit 92". Also, if it is determined that the charge voltage of the second power source unit 92 has reached the "charge target value of the second power source unit 92", it is determined that the second power source unit 92 is fully charged, and the charging of the second power source unit 92 is ended.

Also, for example, "7.5 V" is set as the initial value of the target voltage value. Regarding the target voltage value, in the above-described setting processing, if it is determined that both of the loads 94 and 96 are connected, the setting is changed to "10 V", if it is determined that only the first load 94 is connected, the setting is changed to "9 V", if it is determined that only the second load 96 is connected, the setting is changed to "8 V", and if it is determined that neither of the loads 94 and 96 is connected, the initial value remains as-is. The control unit 44 performs control such that the voltages of the multiple sub-side conductive paths 18 each reach the set target voltage value.

Also, for example, "19 A" is set as the initial value of the maximum current value. Regarding the maximum current value, in the above-described setting processing, if it is determined that both of the loads 94 and 96 are connected, the setting is changed to "40 A", if it is determined that only the first load 94 is connected, the setting is changed to "30 A", if it is determined that only the second load 96 is connected, the setting is changed to "20 A", and if it is determined that neither of the loads 94 and 96 is connected, the initial value remains as-is. When the current value of a sub-side conductive path 18 reaches the maximum current value, the control unit 44 performs the above-described protection operation on that sub-side conductive path 18.

Thus, the power source control apparatus 1 includes multiple output ports 22 and 23 for which the types of the loads 94 and 96 to be connected are determined in advance, and the power source control apparatus 1 can specify the combination of mounted loads (vehicle type) by determining whether or not the loads 94 and 96 are connected to the output ports 22 and 23. Also, the power source control apparatus 1 stores candidate values for the setting values to be used in the control relating to backup in advance in correspondence with the combination of mounted loads (vehicle type). Also, in the setting processing, the setting value corresponding to the specified combination of loads is set. Control relating to backup is performed based on the setting value set in this manner. That is, the power source control apparatus 1 can suitably perform control relating to backup on multiple types of vehicles with mutually different combinations of mounted loads.

Also, the power source control apparatus 1 sets the target value of the charge voltage of the second power source unit 92 as the setting value. Also, charging control is performed so as to reach the set target value. For this reason, control for fully charging the second power source unit 92 can be suitably performed on multiple types of vehicles with different power storage capacities of the second power source unit 92 according to the combination of the mounted loads.

Also, the power source control apparatus 1 sets the target voltage value as the setting value. Then, control is performed such that the voltages of the sub-side conductive paths 18 reach the set target voltage value. For this reason, control can be performed on multiple types of vehicles with different above-described target voltage values according to the combination of the mounted loads 94 and 96 such that the voltage values of the voltages supplied to the loads 94 and 96 reach suitable voltage values.

Also, the power source control apparatus 1 sets the maximum current value of the sub-side conductive path 18 as the setting value. Then, if the set maximum current value is reached, the predetermined protection operation is performed. For this reason, the protection operation can be performed in a suitable period on multiple types of vehicles with different maximum current values according to the combination of the mounted loads 94 and 96.

Other Embodiments

The present disclosure is not limited to the embodiments described according to the above description and the drawings, and for example, the following embodiments are also encompassed in the technical scope of the present disclosure.

In the first embodiment, the "target value of the charge voltage of the second power source unit 92" is specified based on the number of power storage elements 93 set in the setting processing. However, the "target value of the charge voltage of the second power source unit 92" may also be stored in advance in association with the combination of the loads 94 and 96, and the "target value of the charge voltage of the second power source unit 92" corresponding to the combination of the loads 94 and 96 may be set in the setting processing.

In the first embodiment, the charging control is performed based on the number of power storage elements 93 set in the setting processing. Instead of or in addition to this charging control, it is also possible to determine whether or not the second power source unit 92 has undergone breakdown based on the number of power storage elements 93 set in the setting processing. For example, based on the number of power storage elements 93, it is also possible to specify the "target value of the charge voltage of the second power source unit 92" and it is possible to determine a breakdown if the charge voltage of the second power source unit 92 does not reach the target value within a predetermined amount of time after charging is started.

In the first embodiment, a case was described in which there is a maximum of two types of mounted loads, but there may be a maximum of three or more types of mounted loads.

In the first embodiment, it is determined whether or not the loads 94 and 96 are connected by switching all of the main-side switching elements 25 and 27 to the on state and determining whether or not current is flowing in the main-side conductive paths 17. However, it is also possible to determine whether or not the loads 94 and 96 are connected by using another method. However, it is also possible to determine whether or not the loads 94 and 96 are connected based on the voltages of the main-side conductive paths 17.

The invention claimed is:

1. A vehicle-mounted power source control apparatus for performing control relating to backup using a second power source unit in a vehicle-mounted power source system including a plurality of output ports for which types of loads to be connected are determined in advance, a first power source unit for supplying electrical power to the loads connected to the output ports, and the second power source unit, which functions as a backup power source if power supply from the first power source unit is interrupted, the power source control apparatus comprising:
    a setting unit configured to, based on information determining a candidate value for a setting value for each combination of the loads, set the setting value corresponding to the combination of the loads connected to the plurality of output ports; and
    a control unit configured to perform the control relating to backup based on the setting value set by the setting unit,
    wherein the second power source unit includes a plurality of power storage elements,
    the setting unit sets the number of the power storage elements as the setting value, and
    the control unit performs the control relating to backup based on the setting value.

2. The vehicle-mounted power source control apparatus according to claim 1, wherein
    the setting unit sets a target value of a charge voltage as the setting value, and
    the control unit performs charging control such that a charge voltage of the second power source unit reaches the setting value.

3. The vehicle-mounted power source control apparatus according to claim 1, comprising a voltage monitoring unit configured to monitor respective voltages of conductive paths provided separately in correspondence with the respective output ports, the conductive paths being for supplying electrical power to the loads connected to the output ports,
    wherein the setting unit sets a target voltage value of the voltages monitored by the voltage monitoring unit as the setting value, and
    the control unit performs control such that the respective voltages of the conductive paths reach the setting value by performing an on/off switching operation on switching elements respectively provided on the conductive paths.

4. The vehicle-mounted power source control apparatus according to claim 1, further comprising:
    a current monitoring unit configured to monitor respective currents of conductive paths provided separately in correspondence with the respective output ports, the conductive paths being for supplying electrical power to the loads connected to the output ports,
    wherein the setting unit sets a maximum current value of the currents monitored by the current monitoring unit as the setting value, and
    the control unit performs a predetermined protection operation if it is determined that a current value of the conductive paths has reached the setting value.

5. A vehicle-mounted power source apparatus comprising:
    the second power source unit; and
    the vehicle-mounted power source control apparatus according to claim 1.

6. A control method for controlling a vehicle including a plurality of output ports for which types of loads to be connected are determined in advance, a first power source unit for supplying electrical power to the loads connected to the output ports, and a second power source unit that functions as a backup power source if power supply from the first power source unit is interrupted,
    wherein the second power source unit includes a plurality of power storage elements,
    the vehicle control method comprising:
    a step of setting, based on information determining a candidate value for a setting value for each combination of the loads, the setting value corresponding to the combination of the loads connected to the plurality of output ports;
    a step of setting the number of the power storage elements as the setting value in the step of setting the setting value; and
    a step of performing control relating to backup based on the setting value set in the step of setting the setting value.

7. The vehicle-mounted power source apparatus as set forth in claim 5, wherein the setting unit sets a target value of a charge voltage as the setting value; and
    the control unit performs charging control such that a charge voltage of the second power source unit reaches the setting value.

8. The vehicle-mounted power source apparatus as set forth in claim 5, further comprising:
    a current monitoring unit configured to monitor respective currents of conductive paths provided separately in correspondence with the respective output ports, the conductive paths being for supplying electrical power to the loads connected to the output ports,
    wherein the setting unit sets a maximum current value of the currents monitored by the current monitoring unit as the setting value, and the control unit performs a predetermined protection operation if it is determined that a current value of the conductive paths has reached the setting value.

\* \* \* \* \*